United States Patent [19]

Spatafora et al.

[11] Patent Number: 5,133,445

[45] Date of Patent: Jul. 28, 1992

[54] DEVICE FOR FEEDING COMMODITIES IN SUCCESSION

[75] Inventors: Mario Spatafora; Antonio Gamberini, both of Bologna, Italy

[73] Assignee: G.D. Societa Per Azioni, Bologna, Italy

[21] Appl. No.: 696,000

[22] Filed: May 6, 1991

[30] Foreign Application Priority Data

May 8, 1990 [IT] Italy .................. 3485 A/90

[51] Int. Cl.⁵ .............................................. B65G 47/24
[52] U.S. Cl. ..................................... 198/398; 198/624
[58] Field of Search ............... 198/398, 399, 404, 408, 198/624; 221/157, 162

[56] References Cited

U.S. PATENT DOCUMENTS 2,593,627  4/1952  Stover ............................ 198/404
3,402,813  9/1968  Molbach ......................... 198/624
4,557,020 12/1985  Wenzel .......................... 198/399

OTHER PUBLICATIONS

"Orienting Apparatus", Western Electric Technical Digest #5, Jan. 1967, pp. 39-40, Hoenig et al.

Primary Examiner—Joseph E. Valenza
Attorney, Agent, or Firm—Cushman, Darby & Cushman

[57] ABSTRACT

In a device of the type used to supply a wrapping machine, typically with chocolates, conveyed singly and in succession along a belt, any chocolate incorrectly positioned on the belt is rejected by a device including at least one pair of disks rotating tangential to the belt about a shaft that lies transversely to the conveying direction. The two disks combine to create a calibrated passage through which correctly positioned chocolates pass without obstruction, whereas any wrongly positioned chocolate is gripped between the disks and rotated clear of the belt into a reject channel.

4 Claims, 2 Drawing Sheets

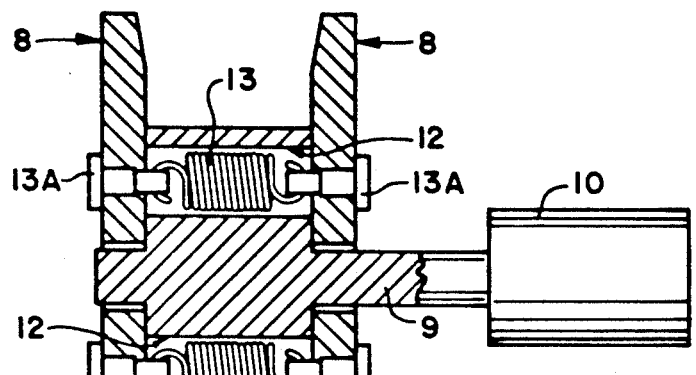
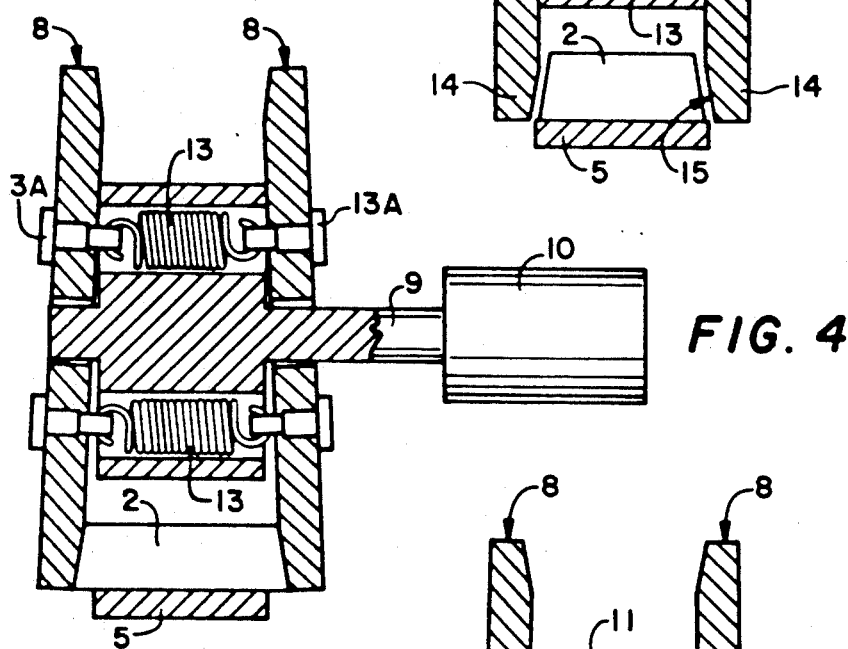
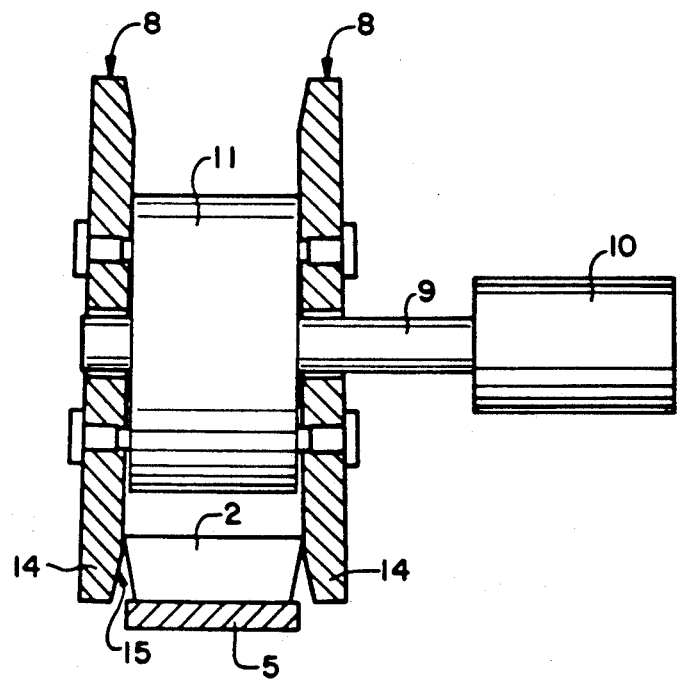

DEVICE FOR FEEDING COMMODITIES IN SUCCESSION

BACKGROUND OF THE INVENTION

The present invention relates to a feeder device by means of which to supply commodities to a wrapping machine.

The invention affords particularly advantageous application in the field of food packaging, and more especially that of confectionery, as a means of supplying chocolates or similar edible goods to a wrapping machine; notwithstanding the fact that following specification refers explicitly to this latter operation, no limitation is implied.

Conventionally, commodities such as chocolates and similar items need to be supplied to their wrapping machines in alignment with one another and facing in the same direction. To this end, use is made in the confectionery industry of alignment devices comprising a revolving platter that is rotatable about a substantially vertical axis and in receipt of a mass of commodities, randomly disposed.

As the platter rotates, each commodity encounters fixed obstacles by which it is diverted into wider and wider circular trajectories, until entering finally on a circular path that extends around the outer periphery of the platter. From this outermost path, banded externally by the edge of the platter and internally by fixed guide means, the commodity is diverted ultimately onto an exit conveyor and taken thence to the wrapping machine.

Friction generated with the surface of the platter and the fixed obstacles causes the commodities to become orientated each with their greater axis parallel to the path of movement, thereby aligning one with another in such a way as to enter the exit conveyor in mutual alignment and in an ordered succession. The length of the peripheral circular path afforded by the platter is such that those commodities which for any reason remain incorrectly orientated, i.e. remain disposed with their greater axis transverse to the feed direction, will project beyond the edge of the platter to the point of falling into a collection receptacle beneath.

The exit conveyor is flanked on either side by fences set apart one from the other at a distance substantially equal to the dimension of the single commodity as measured transversely to its greater axis.

It has been found, however, that commodities having substantially similar longitudinal and transverse dimensions, i.e. those of which the base exhibits an almost square shape (as seen in plan view), manage to pass along the peripheral circular path even though incorrectly orientated.

Consequently, it can happen that commodities are transferred to the exit conveyor despite their being incorrectly aligned, failing to progress beyond the entry or jamming between the side fences, whereupon manual intervention becomes necessary to restore a normal flow of commodities to the wrapping machine. Another drawback is encountered in the particular instance in which conventional devices of the type in question are in receipt of commodities which are generally of frustoconical or frustopyramidal shape.

In the event of such a commodity arriving at the exit conveyor upside down, its progress will not be halted by encountering the entry or jamming between the side fences; instead, the inverted commodity passes into the wrapping machine and inhibits correct operation of the wrapping mechanisms.

SUMMARY OF THE INVENTION

An object of the invention is to provide a device for feeding commodities to a wrapping machine, in which the drawbacks mentioned with regard to the prior art are overcome, i.e. a device that will prevent commodities of any given type, when wrongly positioned, from reaching the wrapping machine.

The stated object is realized in a feeder device for commodities ordered in succession, of a basic type comprising means by which the commodities are conveyed in a given direction, and means by which any commodities disposed in an incorrect manner are rejected.

In the feeder device disclosed, the rejection means incorporate a spring-loaded gripper, by which any commodities disposed in an incorrect manner are picked up and removed along a prescribed rejection path. The gripper itself includes at least one pair of power-driven disks disposed substantially tangential to the conveyor and rotatable about an axis extending transversely to the feed direction.

BRIEF DESCRIPTION OF THE DRAWINGS

The invention will now be described in detail, by way of example, with the aid of the accompanying drawings, in which:

FIGS. 3 and 4 show a portion of the structure shown in FIG. 2 in comparable sections taken along line 3—3 of FIG. 1, with the feeder device in two different operating configurations;

FIG. 5 is a view similar to that of FIG. 4, showing the device according to the invention in a further operating configuration.

DESCRIPTION OF THE PREFERRED EMBODIMENTS

Figure 1:
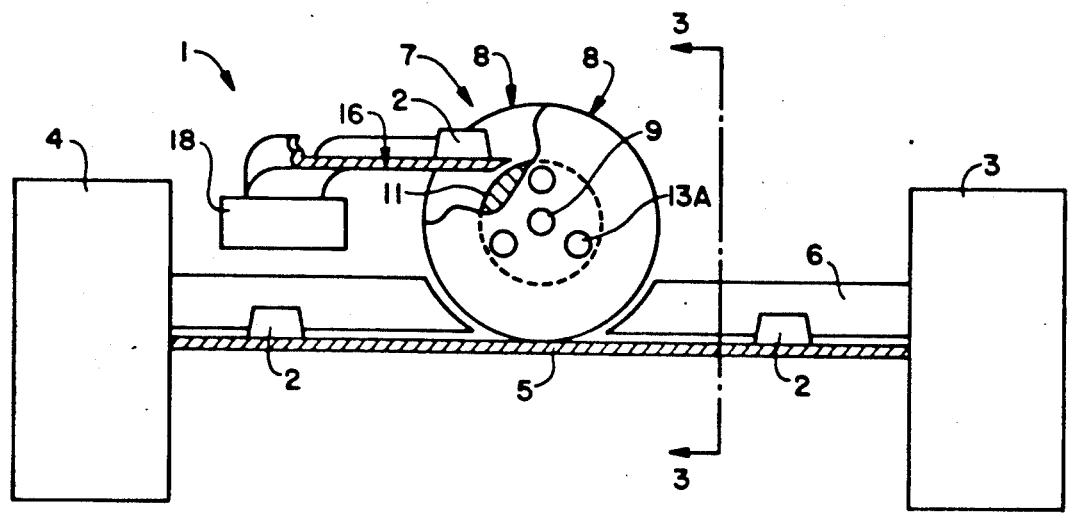
FIG. 1 is the side elevation of a preferred embodiment of the feeder device according to the present invention.
Figure 2:
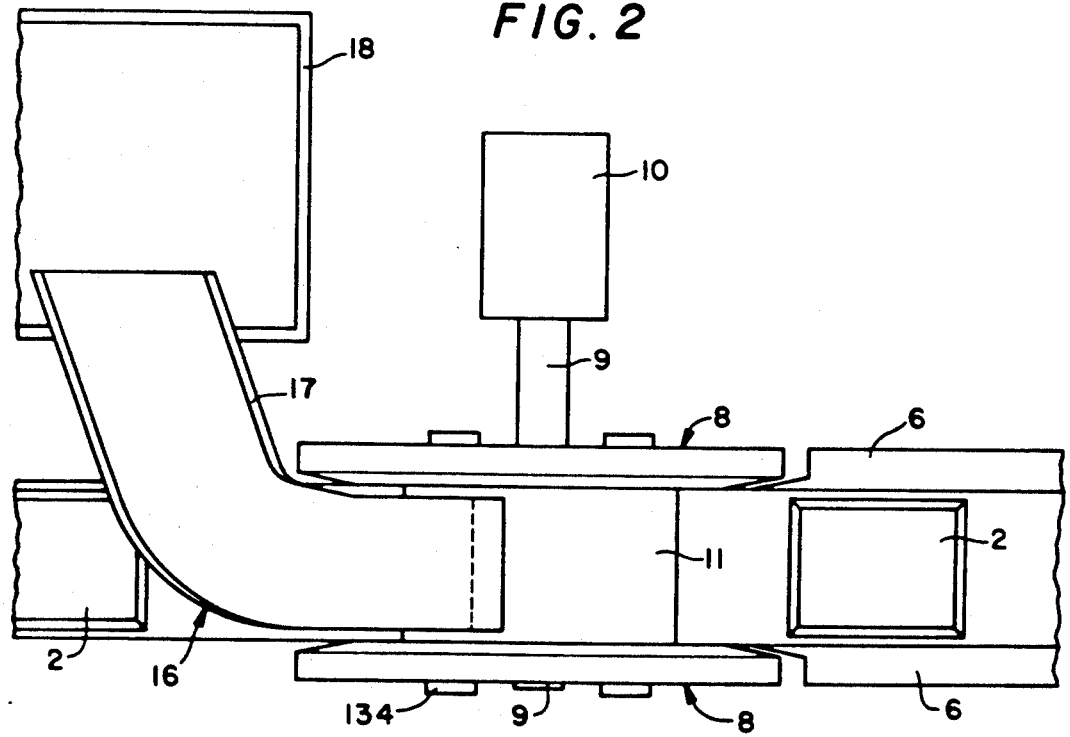
FIG. 2 shows a detail of FIG. 1, enlarged and seen in top plan view.

With reference to FIGS. 1 and 2 of the drawings, 1 denotes a feeder unit, in its entirety, by which commodities 2, typically chocolates, are supplied to production equipment represented schematically by the block denoted 3 and including a wrapping machine.

The single commodities 2, each of which has a base of substantially rectangular shape, are supplied to the unit 1 facing in the same direction and aligned in an orderly single file by a dispensing unit represented schematically by the block denoted 4. The unit 1 comprises a belt 5 looped around rollers at each end (not shown), by which the commodities 2 are conveyed along a path flanked on either side by fixed fences 6 affording a passage that has a width that is substantially equal to the lesser base dimension of the single commodity 2.

The numeral 7 denotes a device located at the entry point of the feeder unit 1, by which commodities 2 emerging wrongly positioned from the dispensing unit 4 onto the belt 5 are gripped and diverted as rejects. The device 7 comprises a pair of rotating elements including two disks 8, mounted on a horizontal shaft 9 that extends transversely to the conveying direction of the belt 5, and set in rotation anticlockwise (as seen from the direction shown in FIG. 1) by a drive unit 10. The shaft 9 comprises an intermediate section 11 of enlarged diameter, occupying the space between the two disks 8 and having three axial holes 12 of which the ends emerge onto the opposite annular end surfaces of the intermediate section 11. The two disks 8 are breasted (i.e., facially engaged) firmly in contact with the relative annular end surfaces of the intermediate section 11 by springs 13, each extending through a respective hole 12 and secured to the disks 8 by its opposite ends with relative anchor devices 13A. The disks 8 are positioned substantially tangential to the belt 5, and increase gradually in thickness from the outer periphery toward the center in such a way that the passage 15 along the belt 5 between their inward facing surfaces appears in plan (FIG. 2), as a narrowing entry merged with a successive parallel stretch, of which the corresponding cross-section, as viewed in FIG. 3, decreases gradually from a width at bottom substantially equal to that of the conveying surface of the belt 5, to a width higher up which, naturally enough, matches that of the parallel stretch following the narrowed entry. The width of the passage at bottom is substantially equal to the lesser base dimension of the single commodity 2, hence also to the width of the passage afforded between the two side fences 6 as mentioned previously, and can be increased by spreading the disks 8 against the action of the springs 13.

The numeral 16 denotes a fixed guide or channel, including a chute of which the entry end is located between the revolving disks 8, substantially tangential to the intermediate section 11 of the shaft 9.

The chute 16 extends in a direction opposite to the feed direction of the unit 1 and is angled marginally downwards, terminating in a runout 17 located above a collection bin 18.

In operation, all commodites 2 emerging from the dispensing unit 4 uniformly orientated and mutually aligned will pass directly from the feeder unit 1 into the wrapping machine 3, running through the passage 15 without forcing the disks 8 apart. In the event of a commodity 2 being incorrectly aligned, and more exactly, dispensed by the supply unit 4 to the feeder unit 1 with its longitudinal axis disposed transversely to the feed direction of the belt 5, that commodity will be removed by the rejection device 7. Such a commodity 2 will, in fact, be forced by the belt 5 between the disks 8 (as in FIG. 4), which, in spreading and thus expanding at least one of the springs 13, function as a revolving gripper by which the offending commodity is lifted from the belt 5 and diverted as a reject along a different path, i.e. that of the chute 16. More exactly, the gripper will rotate through 180° and then release the reject commodity over the chute 16, which provides the route to the collection bin 18.

FIG. 5 illustrates a further incorrect position that may be assumed by a commodity 2 which has a frustopyramidal section and a substantially square base, which commodity has been dispensed upside down to the feeder unit 1. The disks 8 of the rejection device 7 are mutually positioned in such a way that the narrowest width of the passage 15 is less than than that of the greater base dimension of a single commodity 2 and greater than that of the lesser base dimension of the commodity.

Likewise in this instance, the two disks 8 will be spread, functioning as a revolving gripper by which the wrongly positioned commodity is removed from the belt 5 and diverted to the reject bin 18 by way of the chute 16.

The same principle applies where the commodities to be wrapped are of frustoconical shape.

The tangential speed of the disks is suitably greater than the feed velocity of the belt 5, in such a way as to ensure that rejected commodites are not struck by successive commodities in the course of being lifted and removed.

It will be observed that commodities which reach the feeder unit positioned in an incorrect manner are handled by the device with a delicacy such as to permit their subsequent recovery.

What is claimed is:

1. A feeding device for a succession of individual, like-dimensioned, similar articles which each have a given width when oriented in a given orientation right side up and with the widthwise dimension thereof oriented transversally relative to a path of movement, but a wider width than said given width when otherwise oriented, said feeding device comprising:

an endless belt conveyor having an upwardly facing horizontal carrying run which advances along and thereby provides said path of movement;

means for depositing said articles in succession onto said carrying run at a first, upstream location, with each said article nominally having said given orientation but possibly being otherwise oriented;

production equipment means juxtaposed with said carrying run at a second location which is downstream along said path of movement relative to said upstream location and arranged to receive articles having said given orientation from said carrying run; and a rejection means juxtaposed with said carrying run at a location which is intermediate said first and second locations for removing from said carrying run all of said articles which are otherwise oriented relative to said given orientation, said rejection means comprising:

a pair of disks mounted for driven rotation about their own longitudinal axes, on a horizontal axis oriented transversally of said path of movement, said disks spacedly confronting one another from opposite sides of said path of movement;

means resiliently biasing said disks towards one another so that respective confronting faces thereof have respective profiles of closes approach throughout a band of height extending from said carrying run at least to a level equating to that of maximal expected height of said articles when having said given orientation at said intermediate location on said carrying run, which is wide enough to permit articles having said given orientation to pass freely therebetween on said carrying run, but which is narrow enough to engage between them substantially all otherwise oriented articles conveyed to therebetween on said carrying run; said resilient biasing means being arranged and supported to permit said disks, when encountering an otherwise oriented article conveyed to therebetween on said carrying run, to be temporarily forced resiliently apart along said horizontal axis, so as to resiliently grip the respective otherwise oriented article therebetween without such scarring or crushing as would ruin the respective otherwise oriented article, and thereby lift said respective otherwise oriented article from said carrying run; and means for serially extracting from between said faces of said disks and for collecting for recycling to said depositing means, each said otherwise oriented article.

2. The feeding device of claim 1, wherein:

said resilient biasing means permit temporary cocking of said disks relative to said horizontal axis as engagement with a respective otherwise oriented article causes said disks to be resiliently urged apart.

3. The feeding device of claim 1, wherein:
within said band of height, said profiles of closest approach of said confronting faces of said disks progressively decrease in spacing from one another upwards from said carrying run.

4. The feeding device of claim 1, wherein:

said disks are both slidingly mounted on a shaft which extends on said horizontal axis; and said resilient biasing means comprise respective springs having respective one ends anchored with reference to said shaft and respective opposite ends effectively resiliently engaged with respective ones of said disks.

* * * * *